United States Patent
Kwon et al.

(10) Patent No.: US 9,468,011 B2
(45) Date of Patent: Oct. 11, 2016

(54) SYSTEM AND METHOD FOR CHANGING WPAN NETWORK CHANNEL RESPONDING TO WIRELESS ENVIRONMENT CHANGE

(71) Applicant: Korea Electronics Technology Institute, Seongnam-si, Gyeonggi-do (KR)

(72) Inventors: Tai Gil Kwon, Goyang-si (KR); Jin Woong Cho, Seoul (KR); Yong Seong Kim, Goyang-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 108 days.

(21) Appl. No.: 14/264,449

(22) Filed: Apr. 29, 2014

(65) Prior Publication Data

US 2015/0181586 A1 Jun. 25, 2015

(30) Foreign Application Priority Data

Dec. 24, 2013 (KR) .................. 10-2013-0162514

(51) Int. Cl.
*H04W 72/04* (2009.01)
*H04W 72/08* (2009.01)
*H04W 84/18* (2009.01)

(52) U.S. Cl.
CPC ........... *H04W 72/085* (2013.01); *H04W 84/18* (2013.01)

(58) Field of Classification Search
CPC .. H04W 72/02; H04W 72/085; H04W 84/18
See application file for complete search history.

(56) References Cited

U.S. PATENT DOCUMENTS

| | | | | |
|---|---|---|---|---|
| 6,760,317 B1* | 7/2004 | Honkanen | ............... | H04L 1/001 370/329 |
| 2004/0022223 A1* | 2/2004 | Billhartz | ................ | H04L 45/00 370/338 |
| 2007/0165754 A1* | 7/2007 | Kiukkonen | ............ | H04B 1/715 375/346 |
| 2007/0183338 A1* | 8/2007 | Singh | .................... | H04W 16/14 370/252 |
| 2010/0177654 A1* | 7/2010 | Charbit | ................ | H04B 1/7087 370/252 |
| 2010/0278127 A1* | 11/2010 | Jeon | ...................... | H04W 36/06 370/329 |
| 2011/0069684 A1* | 3/2011 | Jeon | .................. | H04W 72/0406 370/336 |
| 2012/0271902 A1* | 10/2012 | Baliga | ................. | H04L 43/0811 709/209 |
| 2013/0024559 A1* | 1/2013 | Susanta | .................. | G06F 9/5083 709/224 |
| 2013/0208598 A1* | 8/2013 | Nakaya | ............. | H04W 28/0236 370/237 |
| 2014/0071807 A1* | 3/2014 | Tohzaka | ................ | H04W 24/04 370/216 |
| 2014/0254400 A1* | 9/2014 | Zhou | ..................... | H04L 1/0026 370/252 |

FOREIGN PATENT DOCUMENTS

| KR | 10-2010-0106030 A | 0/2001 |
|---|---|---|
| KR | 100748094 B1 | 8/2007 |
| KR | 10-2008-0072783 A | 8/2008 |

* cited by examiner

*Primary Examiner* — Benjamin Lamont
(74) *Attorney, Agent, or Firm* — Sughrue Mion, PLLC (57) ABSTRACT

The present invention relates to a system and method for changing a wireless personal area network (WPAN) channel when the quality of communication is degraded due to a change of a wireless environment. The system according to the present invention includes slaves configured to transmit/receive data, and a master connected to the slaves and configured to obtain communication state information of the slaves and select an adjacent channel search slave from among the slaves according to the obtained communication state information of the slaves.

9 Claims, 7 Drawing Sheets

SYSTEM AND METHOD FOR CHANGING WPAN NETWORK CHANNEL RESPONDING TO WIRELESS ENVIRONMENT CHANGE

CROSS-REFERENCE TO RELATED APPLICATIONS

This application claims priority under 35 U.S.C. §119 to Korean Patent Application No. 10-2013-0162514, filed on Dec. 24, 2013, the disclosure of which is incorporated herein by reference in its entirety.

TECHNICAL FIELD

The present invention relates to a system and method for changing a wireless personal area network (WPAN) channel when the quality of communication is degraded due to a change of a wireless environment.

BACKGROUND

According to a wired networking technology of the related art, various devices should be connected to each other through cables, causing difficult installation and management.

A WPAN technology, which has been developed to overcome the limitations of such a wired networking technology, uses communication schemes such as Bluetooth, ZigBee and ultra wide band (UWB).

The WPAN is applied to an environment such as an indoor place, an office or a closed public place to provide a communication service. The WPAN is applied to various fields, for example, the field of industrial control for equipment monitoring and automation, the field of disaster management for recognition and location determination, the field of remote control, the field of automobile control related to a tire pressure sensor or in-vehicle communication, and the field of home network and information appliance.

Figure 1:
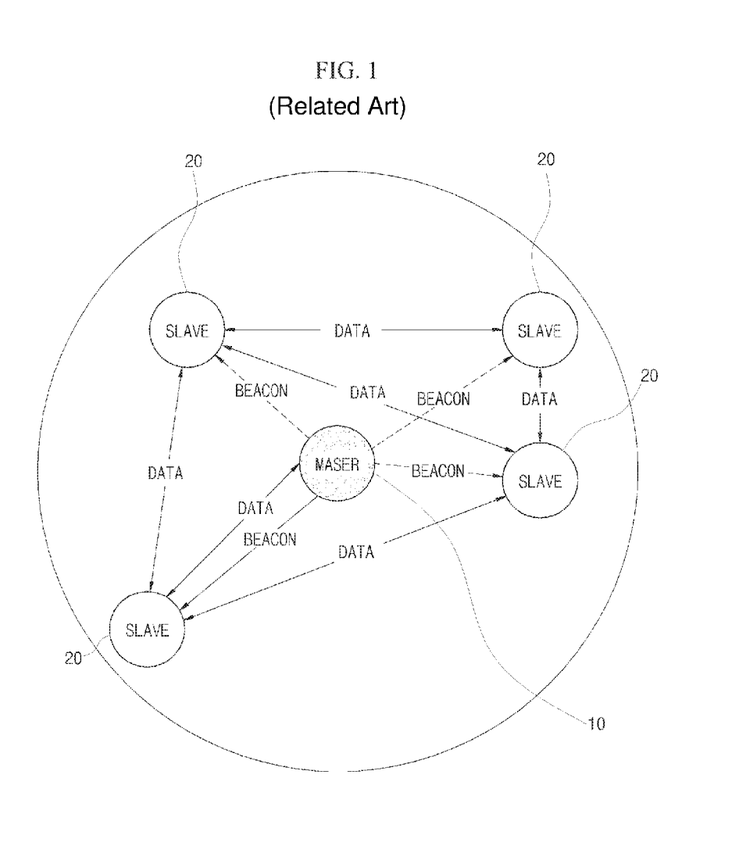
FIG. 1 is a conceptual diagram illustrating data and beacon transmission/reception of a WPAN according to the related art.

FIG. 1 is a conceptual diagram illustrating data and beacon transmission/reception scheme of a WPAN according to the related art. Here, a basic element of the WPAN is referred to as a station.

The WPAN is formed when two or more stations that operate at the same radio frequency channel are present within a personal activity region. Such stations are classified into a master 10 and a slave 20 according to operations thereof.

The master 10 manages the entirety of a piconet, and only one master exists in the piconet.

The piconet is a wireless communication network formed by various independent communication devices using a Bluetooth technology or a UWB communication technology. Devices for forming such a network act as a master or a slave by a control protocol according to a situation.

The piconet is formed in a small space within a radius of several tens of meters and includes both a stationary device and a moving device. According to the piconet, unlike a wireless local area network (WLAN), a base structure for transmission is not preset, but a network between devices is formed by a control protocol according to a situation.

As illustrated in FIG. 1, the master 10 broadcasts a beacon to the slave 20 to control the slave 20, and the slave 20 transmits/receives data according to control by the master 10.

The WPAN illustrated in FIG. 1 is an autonomous network in which devices are able to wirelessly communicate with each other without an access point (AP).

That is, the WPAN according to the related art, which is an ad-hoc-based network for peer-to-peer (P2P) communication, is different from an infrastructure-based network, e.g., a WiFi network, in which devices communicate with each other through an AP.

Figure 2:
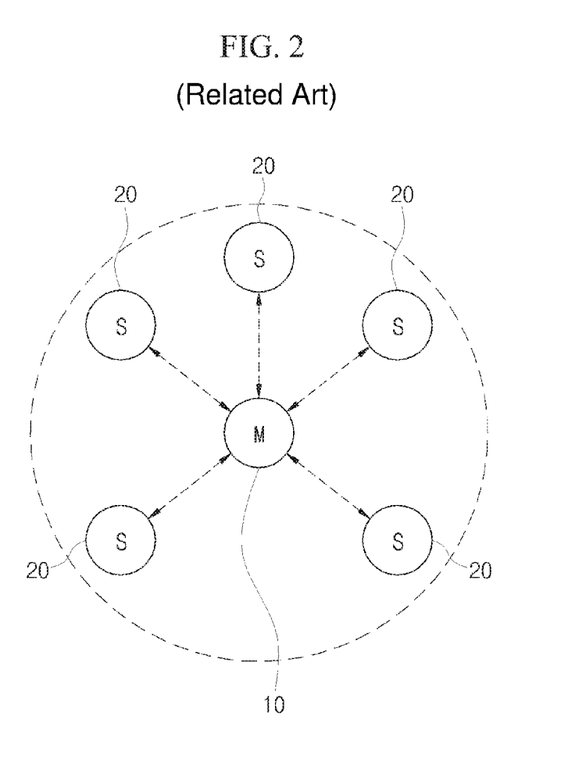
FIG. 2 is a diagram exemplarily illustrating a stat-type network according to the related art.

In the case where the piconet is configured at a specific channel as illustrated in FIG. 1, communication between a master and a slave and communication between slaves may be freely performed. However, for convenience, it is assumed that a star-type application in which communication is only performed between the master 10 and the slave 20 is used as illustrated in FIG. 2.

Regarding an application for communication between the master 10 and the slave 20 using the WPAN according to the related art, when frequency interference on a specific channel occurs, the entire network needs to be moved to another adjacent channel which is free from frequency interference.

Figure 3:
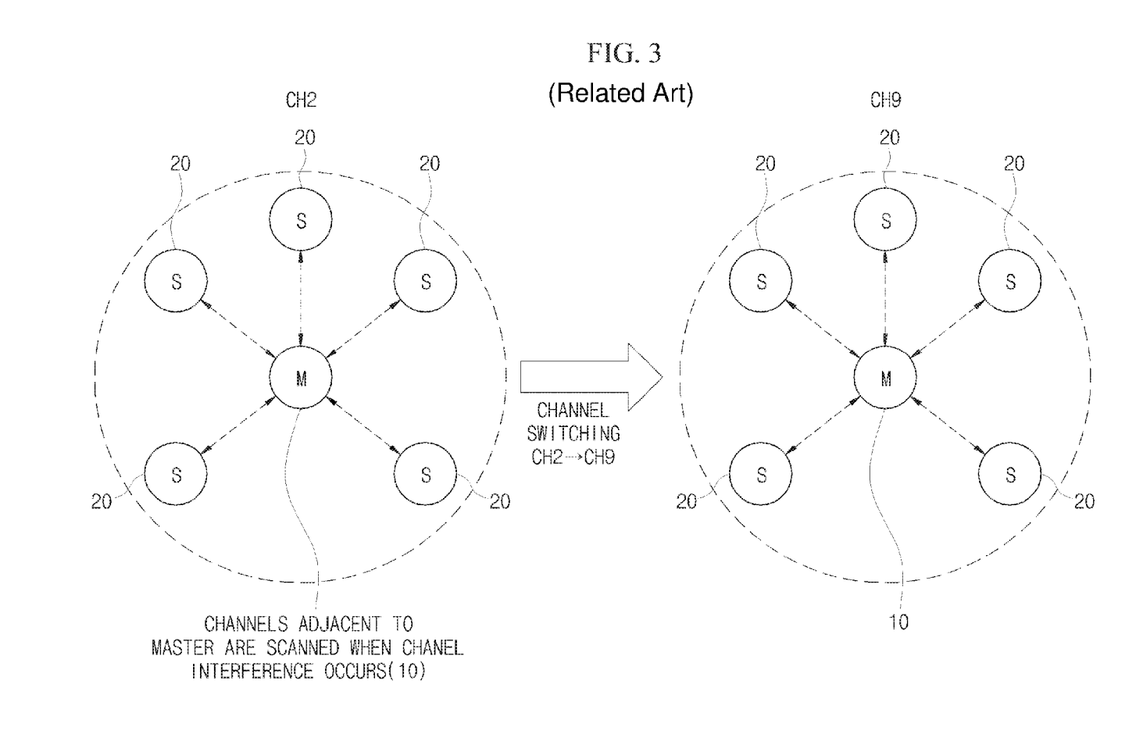
FIG. 3 is a conceptual diagram illustrating master-directed channel switching according to the related art.

FIG. 3 is a conceptual diagram illustrating master-directed channel switching according to the related art which has been proposed to satisfy the above-mentioned necessity.

According to the master-directed channel switching technology of FIG. 3, in the case where a channel is switched, due to occurrence of channel interference, by using a network control function provided by the WPAN, the master 10 scans adjacent channels, and switches a channel of the entire network to a candidate channel that is determined as being least affected by interference on the basis of information on the scanned adjacent channels.

That is, when channel interference occurs on channel 2 at which the mater 10 and the slave 20 communicate with each other, the mater 10 scans adjacent channels, and switches the channel to channel 9 that is determined as being least affected by interference from among the scanned channels.

However, according to the related art, when the mater 10 scans adjacent channels to detect states thereof, all slaves 20 connected to the mater 10 are disconnected from the network, causing communication interruption.

Furthermore, after a channel of the entire network is switched, it takes long time for the slaves 20 disconnected from the network to be reconnected to the master 10. Therefore, a time of communication interruption between the master 10 and the slaves 20, i.e., a time taken until the channel switching is completed after the master 10 scans adjacent channels, becomes long.

Therefore, it may be difficult to apply the master-directed channel switching technology of the related art to an application sensitive to time delay.

SUMMARY

Accordingly, the present invention provides a system and method for changing a WPAN channel depending on a change of a wireless environment, according to which an adjacent channel search slave is selected if interference occurs on a communication channel, and the adjacent channel search slave remotely scans adjacent channels, so as to resolve the problem of communication interruption of the master-directed channel switching technology and rapidly avoid the channel interference.

In one general aspect, a system for changing a wireless personal area network (WPAN) channel depending on a change of a wireless environment includes slaves configured to transmit/receive data, and a master connected to the slaves and configured to obtain communication state information of the slaves and select an adjacent channel search slave from among the slaves according to the obtained communication state information of the slaves.

In another general aspect, a method for changing a WPAN channel depending on a change of a wireless environment includes obtaining communication state information of slaves by calculating PERs of the slaves connected to a master, detecting bad slaves of which a PER is lower than a preset PER, comparing a ratio of the bad slaves to the slaves with a preset ratio, changing a channel through which the master and the slaves communicate with each other when the bad slave ratio is higher than the preset ratio, and selecting an adjacent channel search slave from among the slaves, when the bad slave ratio is lower than the preset ratio.

Other features and aspects will be apparent from the following detailed description, the drawings, and the claims.

DETAILED DESCRIPTION OF EMBODIMENTS

Hereinafter, preferred embodiments of the present invention will be described with reference to the accompanying drawings.

Figure 4:
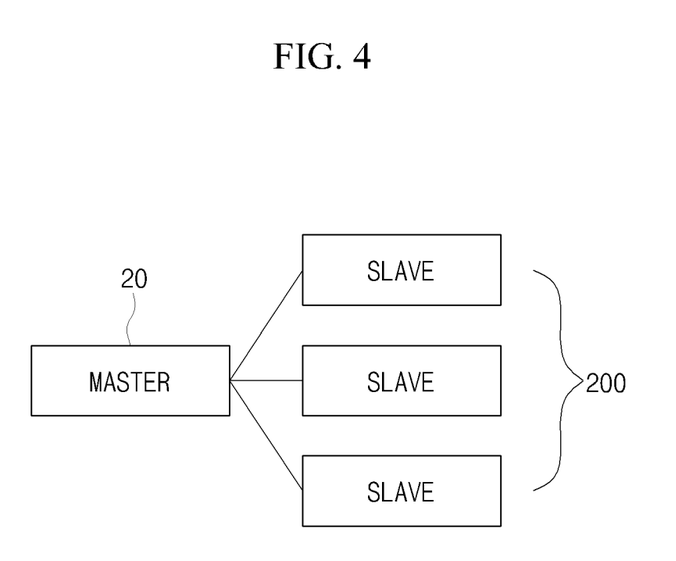
FIG. 4 is a block diagram illustrating a system for changing a WPAN channel depending on a change of a wireless environment, according to an embodiment of the present invention.

FIG. 4 is a block diagram illustrating a system for changing a WPAN channel depending on a change of a wireless environment, according to an embodiment of the present invention. The system for changing a WPAN channel depending on a change of a wireless environment, according to the present invention, includes: a slave 200 for transmitting/receiving data; and a master 20 connected to the slaves 200 to obtain communication state information on the slaves 200 and select an adjacent channel search slave from among the slaves 200 according to the communication state information.

FIG. 4 illustrates an embodiment for helping those skilled in the art understand the present invention. Although FIG. 4 illustrates a star-type structure in which communication is only performed between the master 20 and the slave 200 and data transmission/reception between the slaves 200 is not performed, the connection relation between the master 20 and the slave 200 of the present invention is not limited to the star-type structure.

When interference occurs on a channel through which the master 20 and the slave 200 communicate with each other, the mater 20 recognizes the interference and searches for adjacent channels to detect a candidate channel needed for channel changing by performing remote scanning at a certain period.

A channel change procedure of the mater 20 is periodically performed by a channel change algorithm according to a size of a window. For example, the channel change algorithm may be called at intervals of a preset channel control window second CHANNEL_CTRL_WINDW_SEC in a function that is called at every second.

The master 20 calculates a packet error ratio (PER) of the slave 200 during a certain recent period of time with respect to a current time, and obtains the communication state information of the slave 200 with the calculated PER of the slave 200.

The master 20 selects an adjacent channel search slave from among the slaves 200, and the adjacent channel search slave remotely scans adjacent channels other than the channel through which the master 20 and the slaves 200 communicate with each other and obtains energy levels of the adjacent channels.

The master 20 selects a slave that has least frequently received frames from the master 20 or a slave that has a lowest data reception rate as the adjacent channel search slave, from among the slaves 200 connected to the master 20.

Figure 5:
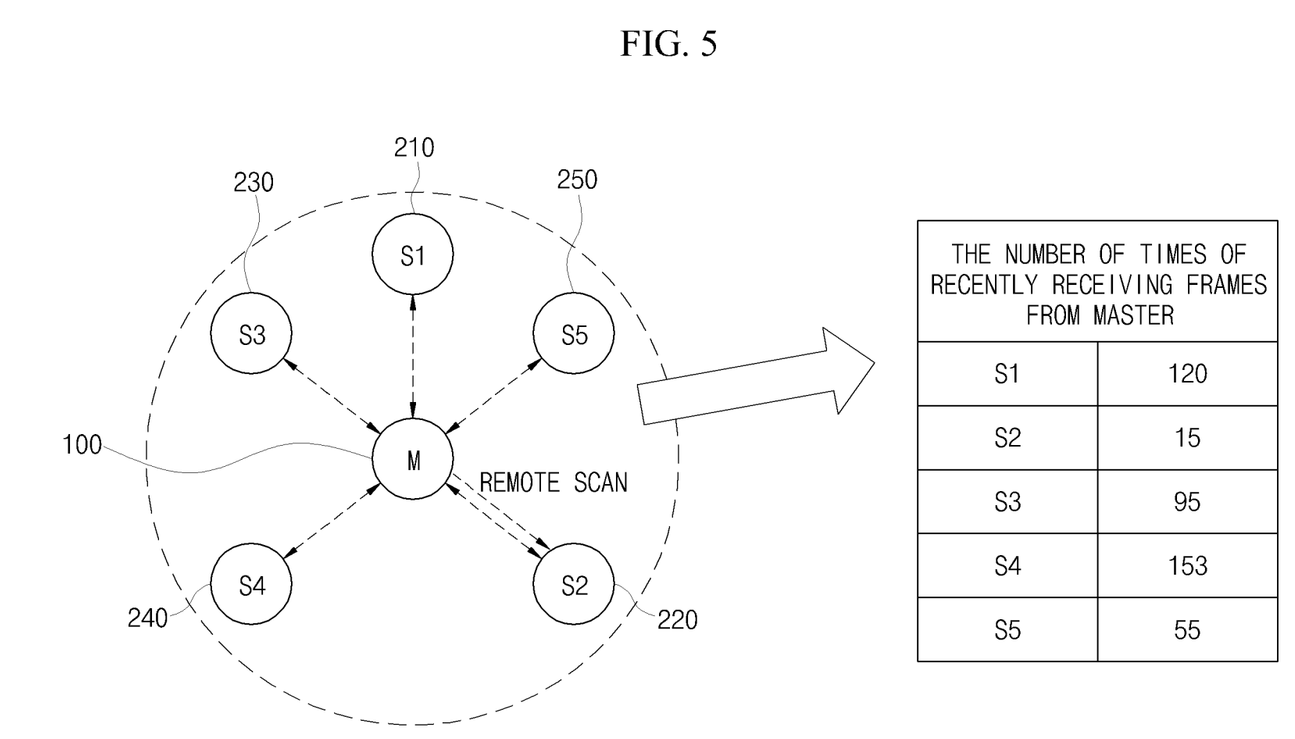
FIG. 5 is a conceptual diagram illustrating a procedure of selecting an adjacent channel search slave for remote scanning of a system for changing a WPAN channel depending on a change of a wireless environment, according to an embodiment of the present invention.

FIG. 5 is a conceptual diagram illustrating a procedure of selecting the adjacent channel search slave. Referring to FIG. 5, in the case where the numbers of times of frame reception of first to fifth slaves 210 to 250 are 120, 15, 95, 153 and 55 respectively, the second slave 220 having the lowest number of times of frame reception is selected as the adjacent channel search slave so as to remotely scan adjacent channels.

The master 100 counts bad slaves classified as having a PER higher than a preset PER, i.e., having a bad communication state. Here, in the case where a ratio of bad slaves to all slaves 200 is higher than a preset ratio, the master 100 selects a channel having a lowest peak energy detection level from among adjacent channels scanned by the adjacent channel search slave 220, and changes the channel through which the master 100 and the slaves 200 communicate with each other to the selected channel.

Figure 6:
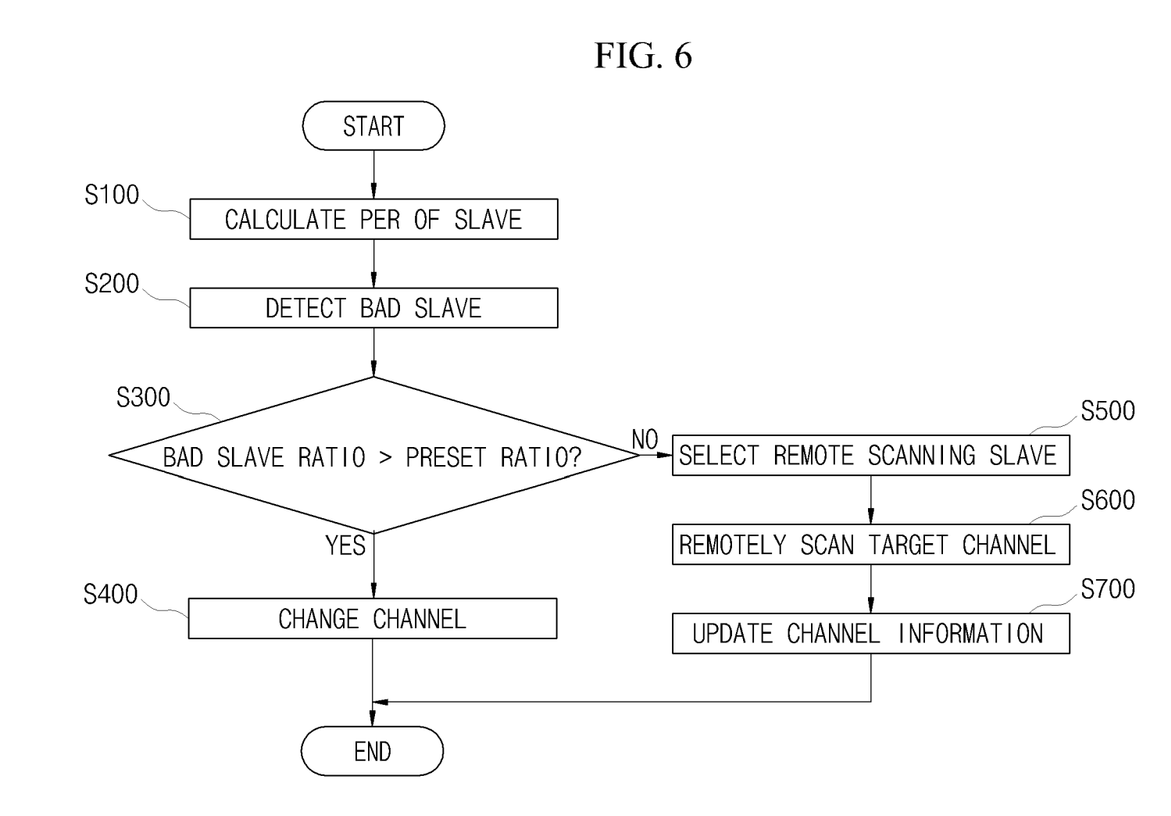
FIG. 6 is a flowchart illustrating a method for changing a WPAN channel depending on a change of a wireless environment, according to an embodiment of the present invention.
Figure 7:
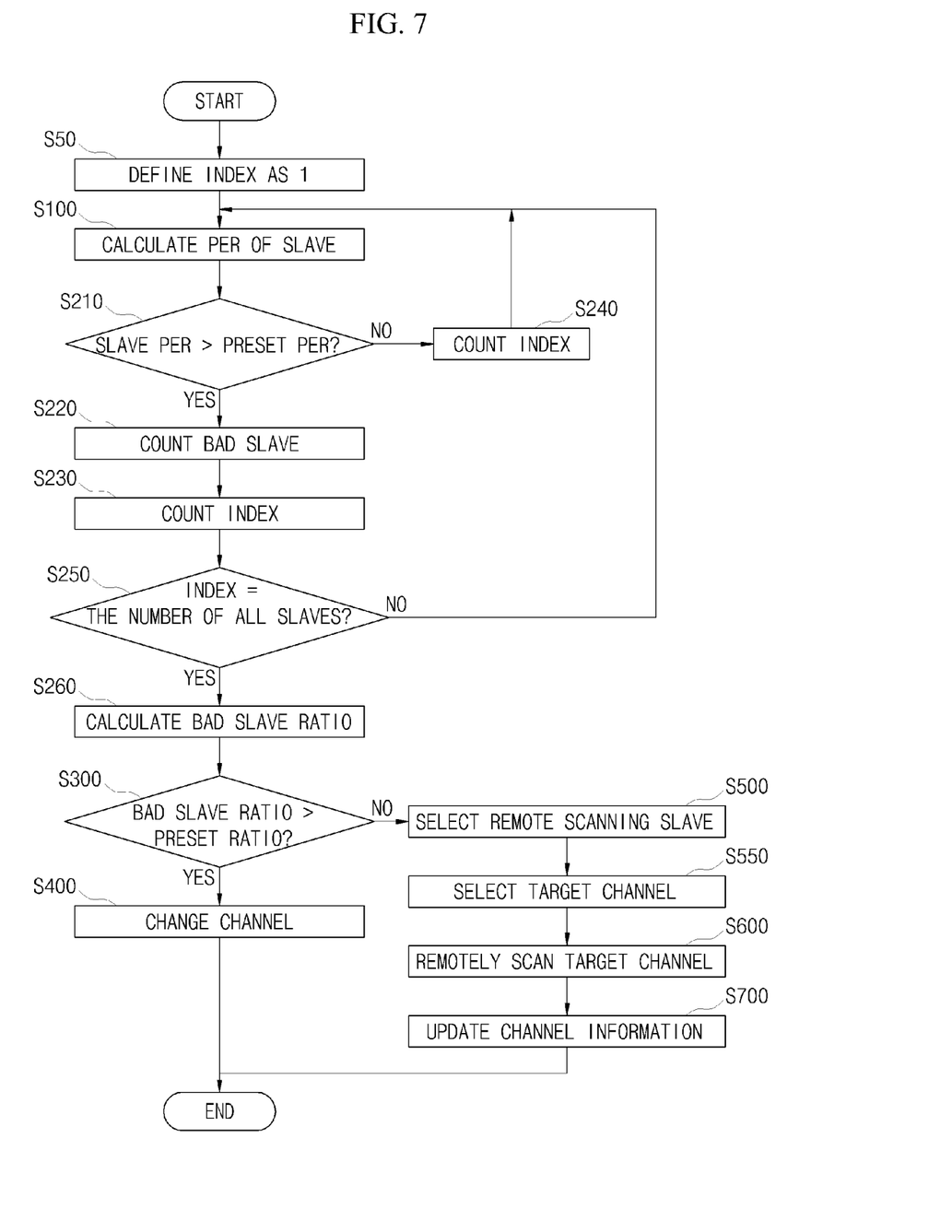
FIG. 7 is a detailed flowchart illustrating the method of FIG. 6 for changing a WPAN channel depending on a change of a wireless environment, according to an embodiment of the present invention.

FIGS. 6 and 7 are flowcharts illustrating a method for changing a WPAN channel depending on a change of a wireless environment, according to an embodiment of the present invention. FIG. 7 is a detailed flowchart of the method of FIG. 6.

The method for changing a WPAN channel depending on a change of a wireless environment, according to an embodiment of the present invention, includes: obtaining communication state information of slaves by calculating PERs of the slaves connected to a master (step S100); detecting bad slaves of which a PER is higher than a preset PER (step S200); comparing a ratio of the bad slaves to the slaves with a preset ratio (step S300); changing a channel through which the master and the slaves communicate with each other when the bad slave ratio is higher than the preset ratio (step S400); and selecting an adjacent channel search slave from among the slaves, when the bad slave ratio is not higher than the preset ratio (step S500).

Before step S100 for calculating the PERs of the slaves, an index of an arbitrary slave among all slaves is defined as 1 (step S50).

After the PERs of the slaves are calculated in step S100, the PERs of the slaves are compared to the preset PER (step S210), and, if the PER of a slave is not higher than the preset PER, index counting is performed without counting the slave as a bad slave (step 240). On the contrary, if the PER of a slave is higher than the preset PER, the slave is counted as a bad slave (step S220), and then, index counting is performed (step S230).

The index counted in steps S230 and S240 is compared with the number of all slaves (step S250), and the bad slave detection through comparison between the PERs of the slaves and the preset PER is repeated until the counted index becomes equal to the number of all slaves.

When the PER comparison for all slaves is completed, the counted index is equal to the number of all slaves, and, in step S260, a ratio of the number of bad slaves to the number of all slaves is calculated. For example, if the number of all slaves is 10 and the number of bad slaves is 4, the bad slave ratio is 40%.

In step S300, it is determined whether the calculated bad slave ratio is higher than the preset ratio. When the calculated bad slave ratio (e.g., 40%) is higher than the preset ratio (e.g., 30%) according to a result of the determination of step S300, the channel through which the master and the slaves communicate with each other is changed to a channel with lowest interference among the adjacent channels in step S400.

On the contrary, when the calculated bad slave ratio is not higher than the preset ratio, the procedure proceeds to step S500. In step S500 for selecting an adjacent channel search slave, a slave having a lowest data reception rate or a salve having a lowest number of times of frame reception from the master is selected as the adjacent channel search slave, from among all slaves.

According to the related art, the slaves are disconnected from the master 100 while the master 100 searches for adjacent channels, which causes communication interruption. Moreover, it takes long time to reconnect the slaves to the master.

The WPAN channel changing method depending on a change of a wireless environment, according to an embodiment of the present invention, has been proposed to overcome such limitation. According to this method, a slave having a lowest data reception rate or a salve having a lowest number of times of frame reception from the master is selected as the adjacent channel search slave (step S500).

That is, instead of the master, the adjacent channel search slave obtains communication environment information of adjacent channels, thereby minimizing the phenomenon of communication interruption of the entire network system which occurs when a channel is changed.

In step S550 of the WPAN channel changing method depending on a change of a wireless environment, according to an embodiment of the present invention, the adjacent channel search slave selects a target channel from among adjacent channels of the channel through which the master and the slaves communicate with each other. The adjacent channel search slave remotely scans the target channel selected in step S550 to obtain energy levels of the adjacent channels (step S600). The channel to be remotely scanned in step S600 is selected in a round-robin manner, and thus, the adjacent channel search slave periodically checks communication states of all channels through remote scanning.

In step S700, the adjacent channel search slave updates channel information using the communication environment information of the adjacent channels obtained in step S600.

In channel changing step S400, according to the channel information updated in step S700, when the bad slave ratio is higher than the preset ratio, the channel through which the master and the slaves communicate with each other is changed to a channel having a lowest energy level from among the adjacent channels.

According to the system and method for changing a WPAN channel depending on a change of a wireless environment, a time of communication interruption between a master and slaves is shortened when a channel is changed due to occurrence of interference on a communication channel.

When the quality of communication is degraded due to occurrence of interference on a communication channel, adjacent channels of the communication channel are searched for, and an optimum channel is selected from among the adjacent channels, so that the channel interference is rapidly avoided. Therefore, the communication interruption or the degradation of the communication quality may be rapidly treated.

The effects of the present invention are not limited to the above-mentioned effects, and other effects would be clearly understood by those skilled in the art.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for changing a wireless personal area network (WPAN) channel depending on a change of a wireless environment, the system comprising:
   slaves configured to transmit or receive data; and
   a master connected to the slaves, and comprising a processor configured to:
      obtain communication state information of the slaves,
      determine a bad slave ratio which is a ratio of a number of the bad slaves to a number of all of the slaves;
      when the bad slave ratio is lower than a preset ratio, select an adjacent channel search slave from among the slaves according to the obtained communication state information of the slaves, and request the selected adjacent channel search slave to scan adjacent channels other than a channel through which the master and the slaves communicate with each other, and
      when the bad slave ratio is higher than the preset ratio, change the channel to one of the adjacent channels,
   wherein the bad slaves have a packet error ratio (PER) that is higher than a preset PER.

2. The system of claim 1, wherein the master selects the adjacent channel search slave on the basis of a data reception rate or the number of times of frame reception.

3. The system of claim 2, wherein the adjacent channel search slave remotely scans adjacent channels other than a channel through which the master and the slaves communicate with each other and obtains energy levels of the adjacent channels.

4. The system of claim 3, wherein the master changes the channel through which the master and the slaves communicate with each other to a channel having a lowest energy level from among the adjacent channels, if a ratio of a number of slaves having a packet error ratio (PER) higher than a preset PER to a number of all of the slaves is higher than a preset ratio.

5. A master station of a wireless personal area network (WPAN), comprising at least one processor configured to: monitor communication states of slaves, select an adjacent channel search slave, request the selected adjacent channel search slave to scan information of adjacent channels other than a communication channel according to the communication states of the slaves, and change the communication channel on the basis of the information of the adjacent channels scanned by the adjacent channel search slave if a bad slave ratio which is a ratio of a number of bad slaves to a number of all of the slaves is higher than a preset ratio,
  wherein the bad slaves have a packet error ratio (PER) that is higher than a preset PER, and
  wherein the master station calculates packet error ratios (PERs) of the slaves to count the bad slaves, and, if the bad slave ratio is lower than the preset ratio, selects the adjacent channel search slave for obtaining energy levels of the adjacent channels, wherein the adjacent channel search slave is selected on the basis of data reception rates or the numbers of times of frame reception of the slaves.

6. A method of changing a wireless personal area network (WPAN) channel depending on a change of a wireless environment, the method comprising:
  obtaining communication state information of slaves;
  detecting bad slaves of which a packet error ratio (PER) is higher than a preset PER;
  determining a bad slave ratio which is a ratio of a number of the bad slaves to a number of all of the slaves;
  changing a channel through which the master and the slaves communicate with each other if the bad slave ratio is higher than a preset ratio; and
  selecting an adjacent channel search slave from among the slaves based on the communication state information and requesting the selected adjacent channel search slave to scan adjacent channels other than the channel, if the bad slave ratio is lower than the preset ratio.

7. The method of claim 6, wherein the selecting of an adjacent channel search slave comprises selecting the adjacent channel search slave according to data reception rates or the numbers of times of frame reception of the slaves.

8. The method of claim 7, further comprising remotely scanning, by the adjacent channel search slave, adjacent channels other than a channel through which the master and the slaves communicate with each other and obtaining energy levels of the adjacent channels.

9. The method of claim 8, wherein the changing of a channel comprises changing the channel through which the master and the slaves communicate with each other to a channel having a lowest energy level from among the adjacent channels, when the bad slave ratio is higher than the preset ratio.

* * * * *